United States Patent [19]

Brown et al.

[11] 4,340,340
[45] Jul. 20, 1982

[54] VACUUM SYSTEM

[75] Inventors: Glenn R. Brown, Euless; James S. McMillan, Benbrook, both of Tex.

[73] Assignee: Plastic Machinery Corporation, Fort Worth, Tex.

[21] Appl. No.: 217,573

[22] Filed: Dec. 18, 1980

[51] Int. Cl.³ .......................... B29F 3/03; B29C 25/00
[52] U.S. Cl. ........................................ 425/71; 55/55;
55/190; 55/199; 264/562; 264/568; 264/209.4;
415/1; 415/108; 417/72; 425/326.1; 425/388;
425/405 R
[58] Field of Search ................. 425/326.1, 70, 71, 74,
425/388, 405 R; 137/179, 216, 565; 264/568,
209.4; 55/55, 57, 189–190, 199, 41; 210/258;
415/108, 1; 417/72, 62

[56] References Cited

U.S. PATENT DOCUMENTS

| 1,004,664 | 10/1911 | Leblanc | 55/190 |
| 2,056,357 | 10/1936 | Luff | 137/216 |
| 3,073,249 | 1/1963 | Yokota et al. | 55/199 |
| 3,169,272 | 2/1965 | Maxson | 264/209.4 |
| 3,455,324 | 7/1969 | Bieri et al. | 137/216 |
| 3,538,210 | 11/1970 | Gatto | 264/568 |
| 3,851,028 | 11/1974 | Beyer | 264/568 |

FOREIGN PATENT DOCUMENTS

| 2322724 | 5/1977 | France | 264/562 |
| 660692 | 5/1979 | U.S.S.R. | 55/190 |

Primary Examiner—Jeffery R. Thurlow
Attorney, Agent, or Firm—Wofford, Fails & Zobal

[57] ABSTRACT

What is disclosed is an improvement in a system for producing a vacuum in which both liquid and gas streams are involved. Specifically, in one aspect the improvement is in a vacuum system for extruding plastic pipe having conventional extrusion apparatus, vacuum tank, mold and vacuum and liquid pumps with a chilled water flow system, the improvement being characterized by an outer housing connected intermediate the effluent water conduit and the liquid pump with a vacuum port connected with a vacuum pump; and an internal sleeve interiorly of the outer housing defining an annular space about the sleeve and directing the combined stream directly into the entrance to the liquid pump so that by inertia the liquid is sucked into the liquid pump whereas the gas is diverted by the vacuum pump to maintain the pressure without flooding the vacuum pump.

4 Claims, 5 Drawing Figures

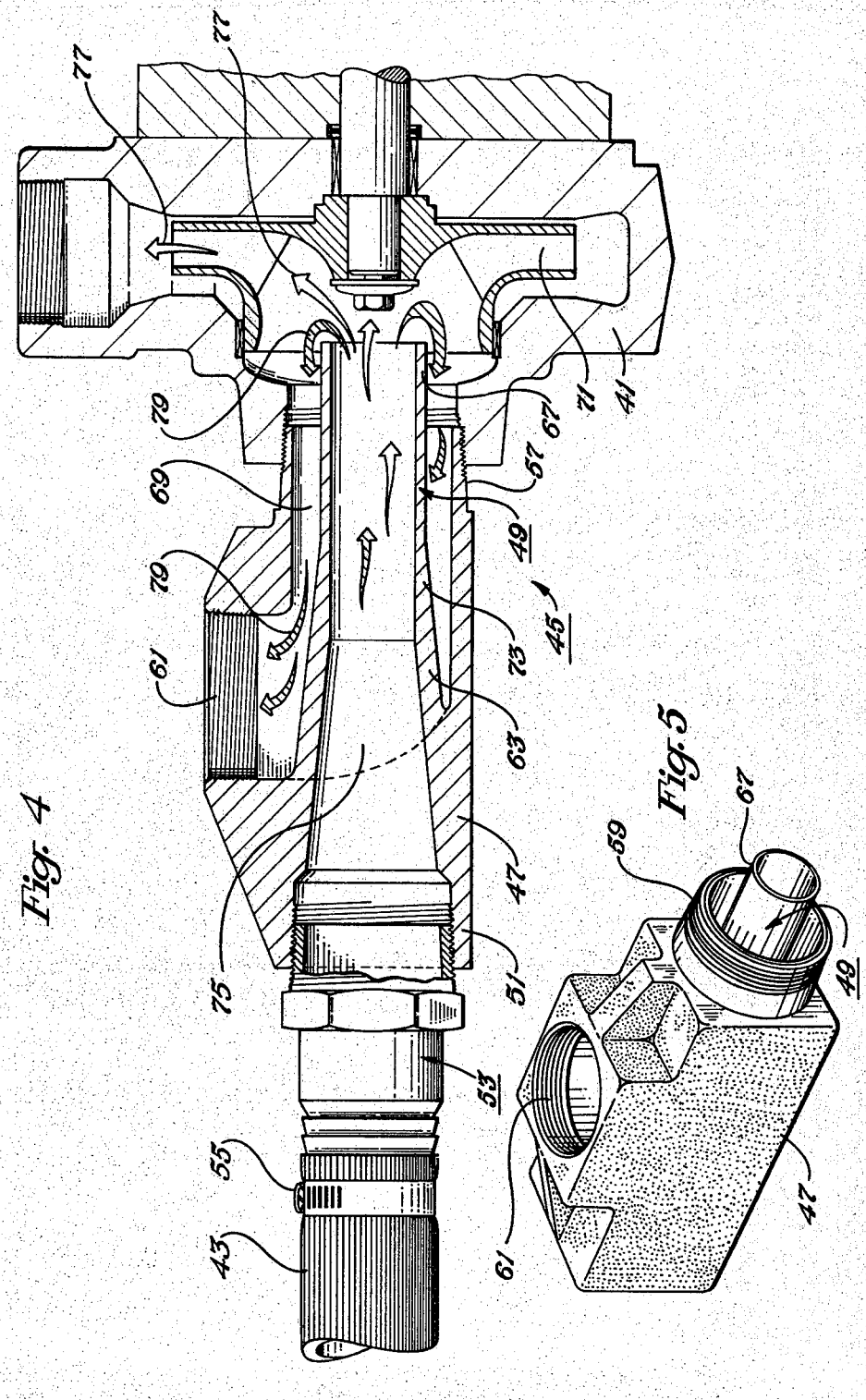

VACUUM SYSTEM

FIELD OF THE INVENTION

This invention relates to an improvement in a system for producing and maintaining a vacuum in which the system has an effluent stream of both liquid and gas having respective gas and liquid pumps for maintaining the vacuum. More particularly, this invention relates to an improvement in a vacuum system for extruding plastic pipe in which a chilled water stream contains gaseous components such that both gaseous and liquid effluent streams have to be pumped to maintain the vacuum to conform the pipe to external predetermined dimensions.

DESCRIPTION OF THE PRIOR ART

A wide variety of systems for producing a vacuum are known in the prior art. One troublesome system has been that involving the pumping of both liquid and gaseous streams from the system to pull the vacuum thereon. Specifically, if the liquid is not separated out, the vacuum pump tends to entrap the liquid and, usually being a positive displacement pump, encounters difficulty with handling the liquid. On the other hand, attempts to separate the liquid have required unduly large separation capacity or complex instrumentation and control to keep from vapor locking the liquid pump. This difficult balancing act has not been solved in an economical way such as in the field of commercial endeavors like extruding plastic pipe.

SUMMARY OF THE INVENTION

Accordingly, it is an object of this invention to provide an improved apparatus that is economical and feasible for ordinary commercial applications and suitable for pulling a vacuum on a system involving flow of both gas and liquid streams.

It is a specific object of this invention to provide an improvement in a system for producing a vacuum for extruding plastic pipe in which the plastic pipe is conformed to an external mold of predetermined dimensions in which both the liquid water and gaseous streams have to be pumped under a vacuum.

These and other objects will become apparent from the descriptive matter hereinafter, particularly when taken in conjunction with the appended drawings.

In accordance with one embodiment of this invention, there is provided an improvement in a vacuum system for extruding plastic pipe including:
a. plastic pipe extrusion means for extruding hot extruded plastic pipe;
b. vacuum tank and cooling means for conforming the plastic pipe to predetermined external dimensions and cooling the hot extruded plastic pipe to a solid plastic pipe;
c. perforate plastic pipe mold for defining the predetermined external dimensions of the plastic pipe; the perforate plastic pipe mold being disposed adjacent the plastic pipe extruding means and interiorly of the vacuum tank;
d. cold water inlet means communicating with the vacuum tank for supplying chilled cooling water for cooling the plastic pipe;
e. effluent water conduit connected with the vacuum tank for circulating warmer water from the vacuum tank;
f. vacuum forming means for pulling a vacuum on the vacuum tank; the vacuum forming means being connected with the effluent water conduit; the improvement comprising:
g. an outer housing having its first end connected with the effluent water conduit and its second end connected with the liquid pump and having intermediate its ends a vacuum port connected with the vacuum pump; and
h. an internal sleeve means for conducting liquid into the impeller of the liquid pump; the internal sleeve means having its first end sealingly connected to the interior wall of the first end of the external housing and extending directly toward the entrance to the pump so as to conduct relatively high velocity liquid by inertia into the impeller; the internal sleeve means having its second end smaller than the second end of the outer housing so as to define an annular space therebetween for withdrawing gas from the incoming stream and conducting the gas to the vacuum pump through the vacuum port such that the vacuum pump is not flooded by liquid.

In another embodiment of the invention, the same improvement is employed in any system to pull a vacuum on an overall system involving the flow of gaseous and liquid streams and employing both gas and liquid pump means.

BRIEF DESCRIPTION OF DRAWINGS

FIG. 4 is a partial cross sectional view showing the improved apparatus of this invention connected at the entrance to a liquid pump similarly as shown in FIG. 3.

FIG. 5 is an isometric view of the apparatus employed in FIG. 4.

DESCRIPTION OF THE PREFERRED EMBODIMENTS

It should be borne in mind that this invention may be employed in a wide variety of applications. Herein, however, it will be described with respect to an improvement in a system for producing a vacuum useful in the extrusion of plastic pipe. This specific description is not to be taken as a limination on the improved apparatus, but merely as a simplified, easily understood application to illustrate the principles.

Figure 1:
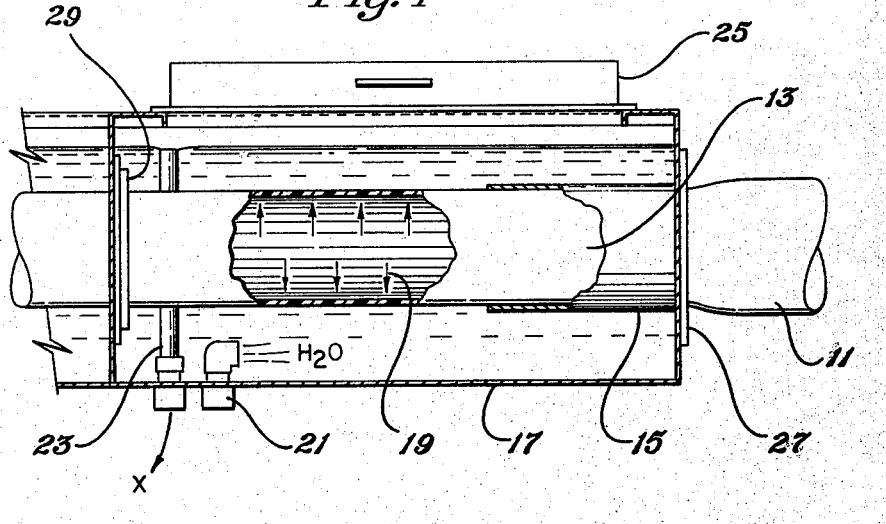
FIG. 1 is a partial cross sectional view of plastic pipe extruding means having a vacuum tank for conforming the plastic pipe to the external dimensions.
Figure 2:
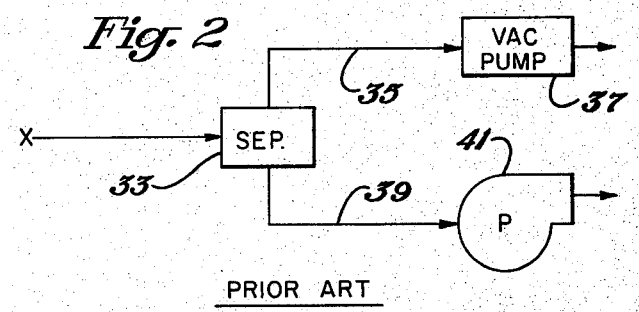
FIG. 2 is a schematic illustration of the prior art approach to maintaining a vacuum on the vacuum tank of FIG. 1.

Referring to FIGS. 1 and 2, there is illustrated a system of the prior art in which there is a plastic pipe extruding means 11 extruding the plastic pipe 13 in hot form into a perforate plastic pipe mold 15 disposed interiorly of a vacuum tank 17. The mold 15 has exact predetermined internal dimensions such that the pipe is pulled outwardly against its walls, indicated by the atmospheric pressure arrows 19 to effect predetermined external dimensions on the pipe. The vacuum tank 17 also serves as a cooling tank having cooling water via cooling water inlet 21 to cool the hot extruded plastic pipe and solidify it. The warmer water is removed from the tank through the effluent water conduit 23, shown with its end opening at the top of the tank. The tank has a top 25 to facilitate repairs or the like.

The plastic pipe extruding means need not be described in great detail. Ordinarily it is a machine that takes a powder and admixes the powder and any lubricants and forces the powder past the heating means to form a viscous liquid. The liquid is forced through dies to extrude in the desired shape of plastic pipe. Consequently, the plastic pipe is formed in a cylindrical shape coming out of the dies.

The mold is formed of suitable material such as a metal that will effect exactly the correct dimensions for the plastic pipe. The mold may be perforate with small openings to effect a uniform vacuum on the pipe. It has been found, however, that such perforations are not necessary except on a microscopic scale in order to be able to conform the pipe to predetermined external dimensions.

The vacuum tank has suitable seals 27, 29 that retain the seal against the vacuum in a conventional structure. Moreover, the top 25 has a suitable internal seal that sealingly engages the lip on the tank. The tank may be any shape. It has been found advantageous to employ substantially square or rectangular cross sectional shape of the tank 17.

The cooling water inlet 21 is connected with a source of cold water, such as a chilled water tank or the like that may be chilled naturally or artifically, as by refrigeration system. A throttling means may be employed to restrict flow of cold water into the vacuum tank and cooling means.

The effluent water conduit 23 is connected, as shown by the point X, to a suitable vacuum forming means for pulling a vacuum on the vacuum tank. As shown in the prior art of FIG. 2, this has comprised a separator 33 where the gaseous and liquid fluids are separated. The gaseous fluids are then pulled by conduit 35 and vacuum pump 37 to maintain a vacuum. The liquids are pulled via conduit 39 and liquid pump 41, such as a centrifugal pump. The word vacuum is shown on the drawings by VAC. The liquid pump is shown as a centrifugal pump although any particular kind of pump desired can be employed. This prior art approach has required careful control of the liquid level in the separator to prevent either pulling a vapor lock on the liquid pump or pulling liquid into the vacuum 37. In fact, once the liquid pump 41 was vapor locked, the separator could then fill up and pull liquid into the vacuum pump 37.

Figure 3:
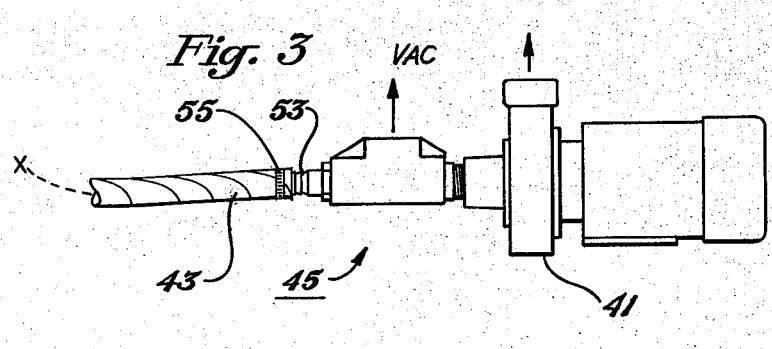
FIG. 3 is a side elevational view of the improved apparatus of this invention.

Referring to FIGS. 3 and 4, this invention provides means to overcome this deficiency. The flexible conduit 43 is connected, as shown by the X, with the effluent water conduit 23. It is also connected upstream of the apparatus 45 in accordance with this invention.

Referring particularly to FIGS. 4 and 5, the apparatus of this invention includes an outer housing 47 and an internal sleeve means 49.

The outer housing 47 has its first end 51 connected with the effluent water conduit, as be way of the flexible conduit 43 and suitable fittings 53. As illustrated, the fittings include flexible hose, hose coupling and hose clamp 55. The outer housing 47 has its second end 57 connected with the liquid pump 41. As illustrated, the connection is by way of threaded end 59.

It will be apparent that a variety of different fittings, swedges and the like can be employed in making the respective connections depending upon the exact nature of the structure of the outer housing and the inner sleeve as well as the type of connections on the pumps and the like. For example, these connections may comprise unions, couplings, threaded connections, flanged connections, and the like.

The outer housing has, intermediate its respective first and second ends, a vacuum port 61 that is connected with the vacuum pump for pumping off the gas in the effluent stream.

The outer housing may be formed of any structurally adequate material such as plastic, metal, or the like. It is preferred to form it of metal because of the ease of manufacturing, working and the structural strength. As illustrated, it is a simple cast iron housing for resistance to corrosion because of the wet atmosphere on its interior surfaces. It can be formed of corrosion resistant metal such as zinc-coated wrought steel, copper, or the like.

Similarly, the fittings may be formed of any suitable metallic alloy, plastic or the like depending upon the structural strength requirements. Preferably, they are somewhat resistant to corrosion by damp atmospheres or water, per se. The vacuum port 61 is connected with the vacuum pump by any suitable conduit and fitting illustrated by the conduit 35, FIG. 2.

The internal sleeve means extends to immediately adjacent the entrance to the pump to conduct the liquid by inertia directly into the liquid pump. As illustrated, the internal sleeve means has its first end in the form of a section 63, FIG. 4, that is sealingly connected with the first end 51. The inner sleeve means 49 has its second end 67 of a smaller external diameter than the internal diameter of the second end 57 of the housing so as to define an annular space therebetween for withdrawing gas. The annular space 69 extends to the vacuum port 61, of course, for withdrawing the gas by the vacuum pump. As illustrated, the second end 67 is a cylindrical section also and protrudes immediately adjacent the entrance to the impeller 71 of the pump 41. This way the relatively high velocity liquid is carried by inertia into the impeller and there has been no problem with vapor locking of the pump employing the apparatus of this invention.

The second end 67 is cylindrical and is connected to a frusto-conical section 73 of the internal sleeve. The frusto-conical section is connected at its first end with the first section 63.

In operation, the conduit 43 is connected directly to the effluent water conduit 23, as shown by the points X without the requirement for an intermediate separator as in the prior art. Yet, the vacuum pump, connected to the vacuum port 61, is able to pump the gases without pumping liquids so as to become liquid flooded. Concurrently, the liquid pump 41 is able to pump the liquids without being vapor trapped to loose its suction. Specifically, the incoming stream 75 comprises both gaseous and liquid states, although the majority may be liquid. The high inertia liquid is fed by inertia into the impeller as shown by blank arrows 77; whereas, the low inertia gaseous molecules have their direction changed by the vacuum field felt by way of the vacuum port 61 and as shown by hatched arrows 79 flow through the annular space 69 to the vacuum port 61 to be taken out of the vacuum pump.

From the foregoing it can be seen that this invention achieves the objects delineated hereinbefore.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter purpose being had to the appended claims.

We claim:

1. In a vacuum system for extruding plastic pipe, including:
   a. plastic pipe extruding means for extruding hot extruded plastic pipe;
   b. vacuum tank and cooling means for conforming the hot extruded plastic pipe to predetermined external dimensions and cooling the hot extruded plastic pipe to a solid plastic pipe;
   c. plastic pipe mold for defining said predetermined dimensions of said plastic pipe; said plastic pipe mold being disposed adjacent said plastic pipe extruding means and interiorly of said vacuum tank;
   d. cold water inlet means for supplying chilled cooling water for cooling said plastic pipe;
   e. effluent water conduit connected with said vacuum tank for circulating the warmer water from said vacuum tank;
   f. vacuum forming means for pulling a vacuum on said vacuum tank; said vacuum forming means being connected with said effluent water conduit and comprising a vacuum pump for pumping a gas and a centrifugal liquid pump having an impeller, an inlet suction port, and a peripheral discharge port for pumping the liquid water; the improvement comprising:
   g. an outer housing having its first end connected with said effluent water conduit and its second end connected with said inlet suction port of said liquid pump and having intermediate its ends a vacuum port connected with said vacuum pump; and
   h. an internal sleeve means for conducting liquid into said impeller directly; said internal sleeve means having its first end sealingly connected to the interior wall of said first end of said outer housing and extending directly toward the entrance to said impeller so as to conduct relatively high velocity liquid by inertia into said impeller; said internal sleeve means having its second end smaller in dimension than said second end of said outer housing so as to define an annular space therebetween for withdrawing gas from the incoming stream and conducting said gas to said vacuum pump via said vacuum port such that said vacuum pump is not flooded by liquid in operation.

2. The vacuum system of claim 1 wherein said internal sleeve means includes a frusto-conical section connected with said first end and a section of smaller external diameter than said second end of said outer housing connected with the second end of said frusto-conical section.

3. Apparatus for pulling a vacuum on a system having a conduit for an effluent stream of both liquid and gas and having a gas pump means for pumping gas and a centrifugal liquid pump means having an impeller, an inlet suction port and a peripheral discharge port for pumping liquid therefrom, comprising:
   a. an outer housing having its first end connected with said conduit of said effluent stream and having its second end connected with said inlet suction port of said liquid pump means and having intermediate its ends a vacuum port connected with said gas pump means; and
   b. an internal sleeve means for conducting liquid into said liquid pump means; said internal sleeve means having its first end sealingly connected to the interior of said first end and extending directly toward the entrance to said impeller of said liquid pump means so as to conduct liquid by inertia into said liquid pump means; said internal sleeve means having its second end smaller in dimension than said second end of said outer housing so as to define an annular space therebetween for withdrawing only gas from the incoming stream; said annular space conducting said gas to said vacuum port and thence to said gas pump means such that said gas pump means is not flooded by liquid.

4. The apparatus of claim 3 wherein said internal sleeve means includes a frusto-conical section connected with said first end and a section of smaller internal diameter than said second end of said outer housing connected with the second end of said frusto-conical section.

* * * * *